(12) United States Patent
Soborski et al.

(10) Patent No.: US 12,462,345 B2
(45) Date of Patent: Nov. 4, 2025

(54) GLARE MITIGATION TECHNIQUES IN SYMBOLOGIES

(71) Applicant: Sys-Tech Solutions, Inc., Princeton, NJ (US)

(72) Inventors: Michael Soborski, Allentown, NJ (US); Bodhayan Dev, Sturbridge, MA (US); Prem Swaroop, Lexington, MA (US); Atish P. Kamble, Acton, MA (US); Matthias Voigt, Lawrenceville, NJ (US)

(73) Assignee: Sys-Tech Solutions, Inc., Princeton, NJ (US)

( * ) Notice: Subject to any disclaimer, the term of this patent is extended or adjusted under 35 U.S.C. 154(b) by 601 days.

(21) Appl. No.: 17/692,063

(22) Filed: Mar. 10, 2022

(65) Prior Publication Data
US 2023/0289922 A1    Sep. 14, 2023

(51) Int. Cl.
*G06K 9/00*    (2022.01)
*G06K 7/14*    (2006.01)
(Continued)

(52) U.S. Cl.
CPC .............. *G06T 5/70* (2024.01); *G06K 7/1413* (2013.01); *G06K 7/146* (2013.01); *G06T 5/50* (2013.01);
(Continued)

(58) Field of Classification Search
CPC ...... G06V 30/10; G06V 20/52; G06V 30/224; G06V 20/10; G06V 20/64; G06V 10/16; G06V 10/25; G06V 20/17; G06V 10/141; G06V 10/28; G06V 20/63; G06V 30/1431; G06V 30/1475; G06V 30/15;
(Continued)

(56) References Cited

U.S. PATENT DOCUMENTS 7,168,621 B2    1/2007    Ghai et al.
8,181,876 B2    5/2012    Smith
(Continued)

FOREIGN PATENT DOCUMENTS

CA    2973849    9/2015
CN    110490791    11/2019
(Continued)

OTHER PUBLICATIONS

S. Ye, J.-L. Yin, B.-H. Chen, D. Chen and Y. Wu, "Single Image Glare Removal Using Deep Convolutional Networks," 2020 IEEE International Conference on Image Processing (Year: 2020).*
(Continued)

*Primary Examiner* — Alex Kok S Liew
(74) *Attorney, Agent, or Firm* — Fish & Richardson P.C.

(57) ABSTRACT

Methods, systems, and apparatus, including medium-encoded computer program products, for glare mitigation techniques include: obtaining images containing a representation of a mark, the images comprising multiple poses of the mark and generating a single image from the images that contain a representation of the mark with reduced glare when compared to the images comprising multiple poses of the mark. The single image is provided for processing of the representation of the mark to identify information associated with the mark.

21 Claims, 11 Drawing Sheets

(51) Int. Cl.

| | |
|---|---|
| *G06T 5/50* | (2006.01) |
| *G06T 5/70* | (2024.01) |
| *G06T 7/246* | (2017.01) |
| *G06T 7/33* | (2017.01) |
| *G06V 10/10* | (2022.01) |
| *G06V 10/24* | (2022.01) |
| *G06V 10/82* | (2022.01) |

(52) U.S. Cl.
CPC .............. *G06T 7/246* (2017.01); *G06T 7/33* (2017.01); *G06V 10/16* (2022.01); *G06V 10/245* (2022.01); *G06V 10/82* (2022.01); *G06T 2207/20221* (2013.01); *G06T 2207/30244* (2013.01)

(58) Field of Classification Search
CPC .. G06V 30/162; G06V 30/166; G06V 10/143; G06V 10/42; G06V 10/243; G06V 10/32; G06V 10/993; G06V 20/13; G06V 20/176; G06V 2201/07; G06V 30/40; G06V 10/147; G06V 10/17; G06V 10/19; G06V 10/22; G06V 10/30; G06V 10/761; G06V 20/62; G06V 2201/06; G06V 30/18143; G06V 30/19067; G06V 30/2247; G06V 30/414; G06V 10/12; G06V 10/255; G06V 10/26; G06V 10/7515; G06V 10/82; G06V 10/98; G06V 20/54; G06V 20/582; G06V 20/68; G06V 2201/09; G06V 30/141; G06V 30/1448; G06V 30/1456; G06V 30/148; G06V 30/153; G06V 30/1801; G06V 30/248; G06V 30/412; G06V 10/225; G06V 10/24; G06V 10/245; G06V 10/44; G06V 10/50; G06V 10/751; G06V 10/757; G06V 10/811; G06V 20/20; G06V 20/40; G06V 30/133; G06V 30/1465; G06V 30/424; G06V 40/1312; G06V 40/16; G06V 40/172
See application file for complete search history.

(56) References Cited

U.S. PATENT DOCUMENTS

| | | | |
|---|---|---|---|
| 8,523,075 | B2 | 9/2013 | Van der Merwe |
| 8,905,314 | B2 | 12/2014 | Van der Merwe et al. |
| 8,950,662 | B2 | 2/2015 | Soborski |
| 9,519,942 | B2 | 12/2016 | Soborski |
| 9,594,977 | B2 | 3/2017 | Lin et al. |
| 9,940,572 | B2 | 4/2018 | Soborski |
| 10,061,958 | B2 | 8/2018 | Voigt et al. |
| 10,234,497 | B2 | 3/2019 | Chang et al. |
| 10,235,597 | B2 | 3/2019 | Voigt et al. |
| 10,318,889 | B2 | 6/2019 | Xu |
| 10,380,601 | B2 | 8/2019 | Soborski |
| 10,387,703 | B2 | 8/2019 | Soborski |
| 10,482,303 | B2 | 11/2019 | Soborski |
| 10,546,171 | B2 | 1/2020 | Soborski |
| 10,552,848 | B2 | 2/2020 | Soborski |
| 10,650,211 | B2 | 5/2020 | Olivastri |
| 10,650,495 | B2 | 5/2020 | Zhang et al. |
| 10,832,026 | B2 | 11/2020 | Soborski |
| 10,922,699 | B2 | 2/2021 | Soborski |
| 2015/0379321 | A1 | 12/2015 | Soborski |
| 2016/0267304 | A1* | 9/2016 | Wu ..................... G06K 7/146 |
| 2018/0134127 | A1* | 5/2018 | Winn .................... G06T 5/77 |
| 2020/0380229 | A1 | 12/2020 | Peruch et al. |
| 2022/0284208 | A1* | 9/2022 | Yamada ............... G06K 7/1447 |
| 2023/0065074 | A1 | 3/2023 | Rafferty et al. |

FOREIGN PATENT DOCUMENTS

| | | |
|---|---|---|
| CN | 110717450 | 1/2020 |
| CN | 110852937 | 2/2020 |
| CN | 111241873 | 6/2020 |
| CN | 112396058 | 2/2021 |
| EP | 3000073 | 3/2016 |
| EP | 3259918 | 12/2017 |
| EP | 3507773 | 7/2019 |
| WO | WO 2019168381 | 9/2019 |
| WO | WO 2021068142 | 4/2021 |

OTHER PUBLICATIONS

Lee ByeGlassesGAN: Identity Preserving Eyeglasses Removal for Face Images, arXiv:2008. 11042v1 [cs.MM] Aug. 25, 2020 (Year: 2020).*
U.S. Appl. No. 63/292,706, Dev et al.
Azim, "Identification of Textile Defects Based on GLCM and Neural Networks," Journal of Computer and Communications, Oct. 2015, 3(12):1-8.
Gatys et al., "Image Style Transfer Using Convolutional Neural Networks", Presented at IEEE Conference on Computer Vision and Pattern Recognition (CVPR), Las Vegas, NV, USA, Jun. 27-30, 2016, pp. 2414-2423.
genuinecoder.com [online], "Fake (Photoshopped) Image Detection using Machine Learning," available on or before Nov. 2018, retrieved on Apr. 28, 2022, retrieved from URL<https://www.genuinecoder.com/fake-photoshopped-image-detection-using-machine-learning/>, 2 pages.
Heartbeat.comet.ml [online], "Image Classification on Mobile with Flutter, TensorFlow Lite, and Teachable Machine," Sep. 14, 2020, retrieved on Apr. 28, 2022, retrieved from URL<https://heartbeat.comet.ml/image-classification-on-mobile-with-flutter-tensorflow-lite-and-teachable-machine-f7de39598e0c>, 10 pages.
heartbeat.comet.ml [online], "TensorFlow Lite Image Classification Models with Model Maker," Mar. 18, 2021, retrieved on Apr. 28, 2022, retrieved from URL<https://heartbeat.comet.ml/tensorflow-lite-image-classification-models-with-model-maker-a144801d2abd>, 11 pages.
IEEE Standards Association, "754-2019—IEEE Standard for Floating-Point Arithmetic," Jul. 22, 2019, 84 pages.
Li et al., "Style transfer for QR code", Multimedia Tools and Applications, Dec. 2020, 14 pages.
Shang et al., "Detecting documents forged by printing and copying," EURASIP Journal on Advances in Signal Processing, Sep. 8, 2014, 13 pages.
Stenhagen et al., "Improving Realism in Synthetic Barcode Images using Generative Adversarial Networks", Master of Science Thesis in Electrical Engineering, Linköping University, 2018, 83 pages.
Tchan et al., "The Use of Neural Networks in an Image Analysis System to Distinguish Between Laser Prints and Their Photocopies," Journal of Imaging Science and Technology, Mar. 2000, 44(2):132-144.
Tchan, "Classifying digital prints according to their production process using image analysis and artificial neural networks," Optical Security and Counterfeit Deterrence Techniques III, Apr. 7, 2000, pp. 105-116.
Vohra et al., "Signature Verification Using Support Vector Machine and Convolution Neural Network," Turkish Journal of Computer and Mathematics Education, Nov. 2020, 12(1S):80-89.
Zharkov et al., "Universal Barcode Detector via Semantic Segmentation," arXiv, Jun. 17, 2019, 7 pages.

* cited by examiner

200

600A

700

GLARE MITIGATION TECHNIQUES IN SYMBOLOGIES

BACKGROUND

Marks are applied to a good to uniquely identify the good. A mark is a symbol that encodes information in accordance with a predefined symbology. Marks are often captured by image capture devices to obtain images that include the marks for further processing. The captured images can include noise such as glare. Glare in the captured images can impact the further processing applied to the images.

SUMMARY

An embodiment described herein provides a method. The method includes obtaining images containing a representation of a mark, the images comprising multiple poses of the mark and generating a single image from the images that contain a representation of the mark with reduced glare when compared to the images comprising multiple poses of the mark. The method also includes providing, with the at least one processor, the single image for processing of the representation of the mark to identify information associated with the mark.

Another embodiment described herein provides a system. The system includes at least one processor, and at least one non-transitory storage media storing instructions that, when executed by the at least one processor, cause the at least one processor to obtain images containing a representation of a mark, the images comprising multiple poses of the mark. The instructions generate a single image from the images that contain a representation of the mark with reduced glare when compared to the images comprising multiple poses of the mark. Additionally, the instructions provide the single image for processing of the representation of the mark to identify information associated with the mark.

An embodiment described herein provides at least one non-transitory storage media storing instructions that, when executed by at least one processor, cause the at least one processor to obtain images containing a representation of a mark, the images comprising multiple poses of the mark. The instructions generate a single image from the images that contain a representation of the mark with reduced glare when compared to the images comprising multiple poses of the mark. Additionally, the instructions provide the single image for processing of the representation of the mark to identify information associated with the mark.

Another embodiment described herein provides a method. The method includes obtaining images containing a representation of a mark, the images comprising multiple poses of the mark and selecting a base image having a lowest tilt angle from the images comprising multiple poses of the mark. The method also includes aligning a remainder of the images comprising multiple poses of the mark with the base image and fusing the aligned images to generate a fused image of the mark with reduced glare when compared to the images comprising multiple poses of the mark.

Another embodiment described herein provides a method. The method includes obtaining first images containing a representation of a mark, the images comprising multiple poses of the mark and generating a single image with reduced glare from the first images using a trained machine learning model, wherein the glare associated with the single image is reduced relative to glare associated with the first images. The method also includes providing the single image for processing of the representation of the mark to identify information associated with the mark.

DETAILED DESCRIPTION

Noise in captured images, such as glare (e.g., specular reflection, areas of saturation in an image), can led to a substantial decline in accuracy when detecting photocopy or counterfeit marks contained in the images. Accordingly, reducing or eliminating glare in captured images increases accuracy of processes that rely on captured images, such as processes that detect photocopy of counterfeit marks. The present techniques reduce or eliminate glare in captured images, where the images include a symbology. The glare is reduced or eliminated using alignment-fusion techniques, neural networks, or any suitable combinations thereof. For example, computer vision alignment techniques are applied to images in conjunction with a fusion process. In examples, the neural networks include deep-learning based neural networks trained using multiple pose (e.g., multi-pose) high fidelity machine vision image pairs.

In some embodiments, photocopy or counterfeit marks can be detected using a fingerprinting process applied to an image with reduced glare. Generally, marks are used to convey information or data (e.g., a message) associated with goods, and are applied to the goods or packaging of the goods. Marks can be referred to as an "original item identifier" and include quick response (QR) codes and barcodes. In some cases, marks are created using a thermal transfer or ink-jet process to create highly uniform, solid, black or other printed areas using a predetermined format. A set of metrics are extracted from the image with reduced glare, and an electronic signature is generated based on the set of metrics. The electronic signature is further analyzed to determine if a corresponding mark is a photocopy or counterfeit mark.

Figure 1:
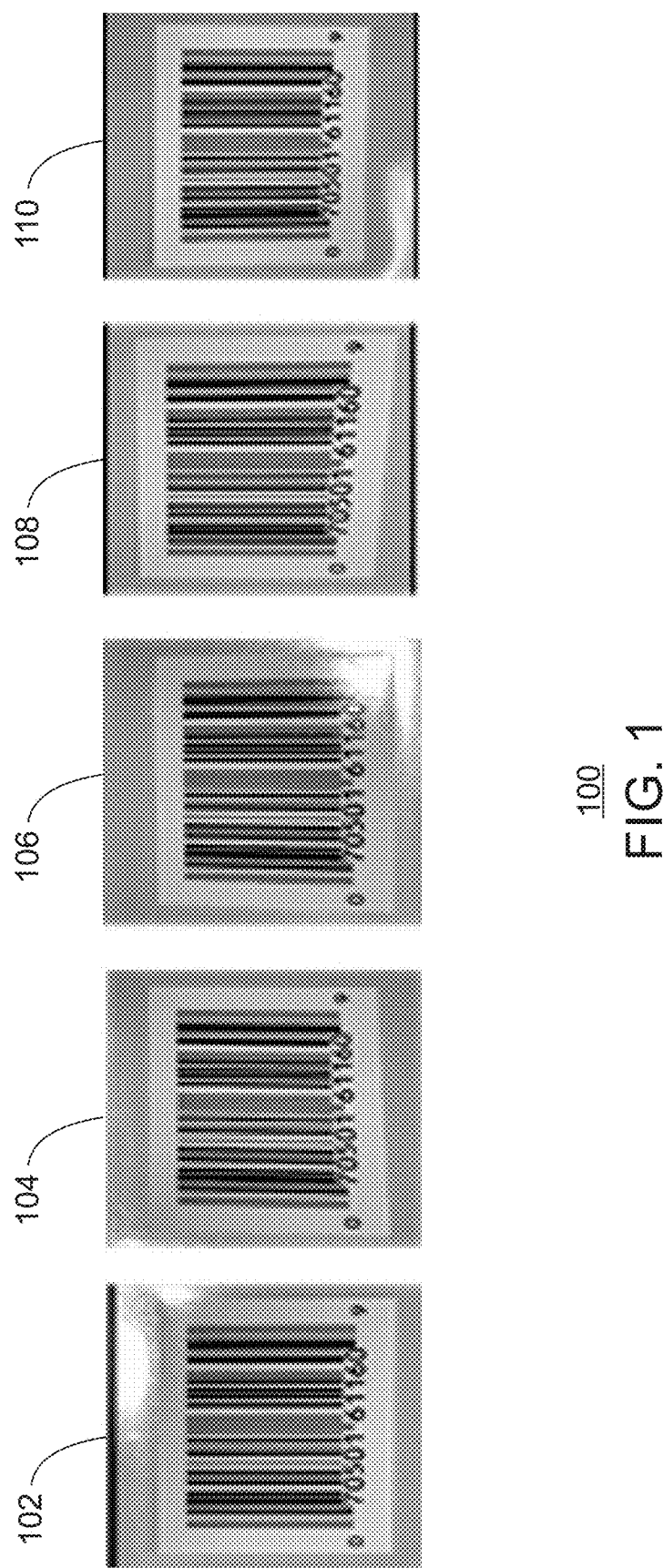
FIG. 1 shows examples of a symbology.

FIG. 1 shows examples of a symbology 100. Generally, a mark is a symbol that encodes information in accordance with a predefined symbology. The marks can be visible or invisible to the human eye, such as marks with inks that are invisible until they fluoresce under UV light. In FIG. 1, several images of a same mark are shown, each at a different pose, with varying levels of illumination, varying levels of glare, and varying locations of the glare. Generally, the images 102, 104, 106, 108, and 110 are images captured in the wild. Images captured in the wild refers to images captured during other processes not specifically related to capturing a high quality image. The device may capture an image of a mark while the mark is moving, such as on an assembly line. Wild images captured on the assembly line of a factory often include glare. In examples, images of a mark are captured along the assembly line to monitor the flow of goods and to enable supply chain management. Images corrupted by glare can degrade the results of electronic signatures or comparisons based on the corrupted images. In particular, counterfeit detection algorithms based on generated signatures in conjunction with correlation scores can be inaccurate when based on images corrupted by glare. The present techniques reduce or eliminate glare without compromising the signature-based authentication, thus avoiding degradation of the scores or metrics associated with the signature-based authentication.

In some embodiments, the images are high resolution images. The resolution can vary. In some examples, a high resolution image is an image that has a resolution of greater than 96 dots per inch (dpi). An image capture device such as a cell phone, camera, scanner, or other device (e.g., controller 1002 of FIG. 10) can be used to capture the images containing a representation of the same mark. In some examples, the images include multiple poses of the same mark. The pose of the mark refers to a position and orientation of the mark in a given image. In some embodiments, the pose is determined by calculating a tilt angle of the mark captured in an image.

The device captures multiple images of the mark. During the course of image capture, poses of the mark may vary. In some cases, the variation in poses among images is minimal, such that the mark is at a substantially similar pose in the multiple images. This can occur, for example, when the images are taken in a short period of time (e.g., less than a couple of seconds) or as the result of a burst mode that automatically captures multiple images in rapid succession. In some cases, the variation in poses creates at least one image with the same mark in a different pose when compared to the multiple images. This can occur, for example, when the images are taken over a longer period of time (e.g., more than a couple of seconds). In some cases, the multiple images vary in the amount of glare present in the image. For example, the multiple images can have glare in multiple areas of the image.

In the example of FIG. 1, the same mark is a barcode. However, the present techniques are applicable to marks including, but not limited to, barcodes, two-dimensional matrix-type barcodes (e.g., quick response (QR) codes), marks generated by laser print, and the like. Generally, a QR-code is a machine-readable, two-dimensional matrix-type barcode that visually consists of black squares arranged in a square grid on a white background. The QR-code is captured by an image capture device such as a camera, and is processed using error correction to extract information contained in the QR-code. In particular, data is extracted from patterns that are present in both horizontal and vertical components of the mark. Similarly, the barcode is a machine-readable, one-dimensional linear-type barcode. Similar to a QR-code, a barcode is captured by an image capture device such as a camera, and is processed to extract data contained in the barcode. The laser print is created by non-contact printing, such as laser or thermal printing. The laser printing marks engrave high quality one dimensional (1D) or two dimensional (2D) barcodes or QR-codes, multiple lines of text, batch numbers, lot codes, logos, and the like on goods. Note that marks can also be produced by other contact based or non-contact based printing techniques, such as thermal transfer printing or continuous inkjet (CIJ) printing.

The mark including the barcode captured in the images 102-110 is captured by an image capture device, such as a scanner or camera, and is processed to generate an image with reduced or eliminated glare. The image capture device detects an intensity of light reflected by spaces in the pattern created by the mark. In some embodiments, an illumination system outputs infrared light that is reflected by portions of the mark, and the image capture device captures reflected infrared light. Processing the mark includes, for example, reducing or eliminating glare in the images 102-110 and generating an image including the mark with reduced glare or eliminated glare. An image with eliminated glare is an image that is glare-free. In some embodiments, the mark in the reduced or glare-free image is further processed to determine an authenticity of the mark.

For ease of description, particular symbologies are described. However, the symbologies may include any suitable mark. In some cases, the mark represents data in a machine-readable form. In examples, the symbology is continuous or discrete. In examples, a continuous symbology is one in which the entire symbology is read at once. Portions of a continuous symbology may be invalid. By contrast, a discrete symbology is a symbology with multiple independent portions. The symbology may be two-width or many width, with several bars or spaces that are multiples of a basic width. In some cases, the symbology includes interleaving. In interleaving, a first character is encoded using black bars of varying width and the second character is then encoded by varying the width of the white spaces between black bars of the first character. Characters are encoded in pairs over the same section of the barcode.

Glare can be reduced or eliminated using multi-pose image capture techniques. As discussed above, images that contain representations of a mark in a machine-readable form (such as a bar code, QR code, and the like) can become corrupted in the presence of glare. The images are processed to obtain a clean, glare free image. In some embodiments, an alignment process is implemented in conjunction with a single or ensemble of image fusion techniques to create a glare-free image. In some embodiments, a neural network is trained using image pairs that each include a multi-pose image along with a corresponding high fidelity machine vision image. Generally, high fidelity machine vision images are captured in a controlled environment. For example, high fidelity machine vision images can be captured in an industrial production packaging line at a manufacturer. As such, these images can be assumed to be artifact-free, without any corruptions, glare or otherwise. Once the training process is completed, the trained neural network is executed on unseen images containing glare to generate a glare-free image. In this manner, a neural network model is produced that generates glare free images for authentication. The authentication based on the glare free images produce reliable results even in view of noisy input images that include glare.

Figure 2:
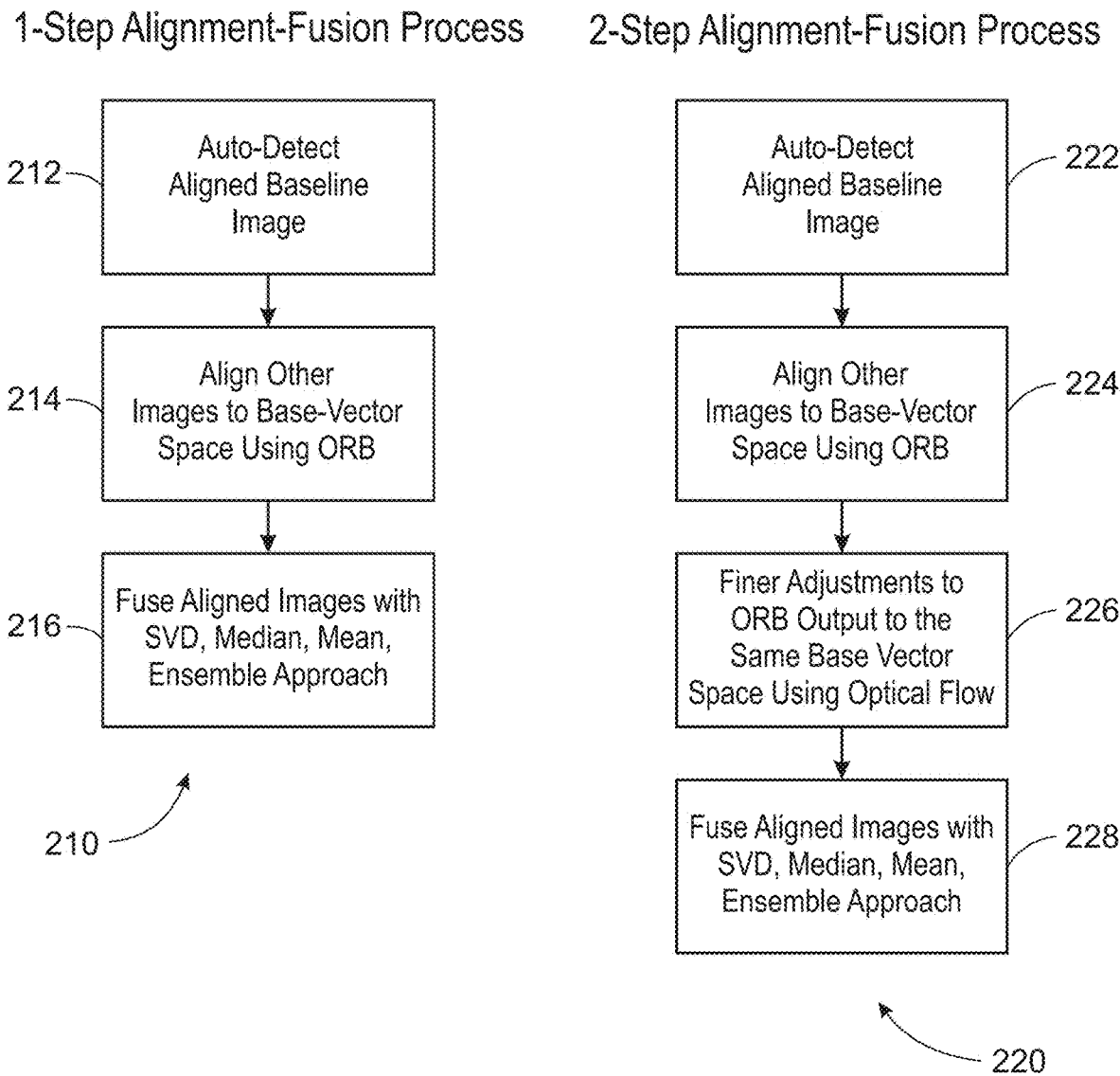
FIG. 2 is a block diagram of workflows for glare mitigation techniques in symbologies.
Figure 3:
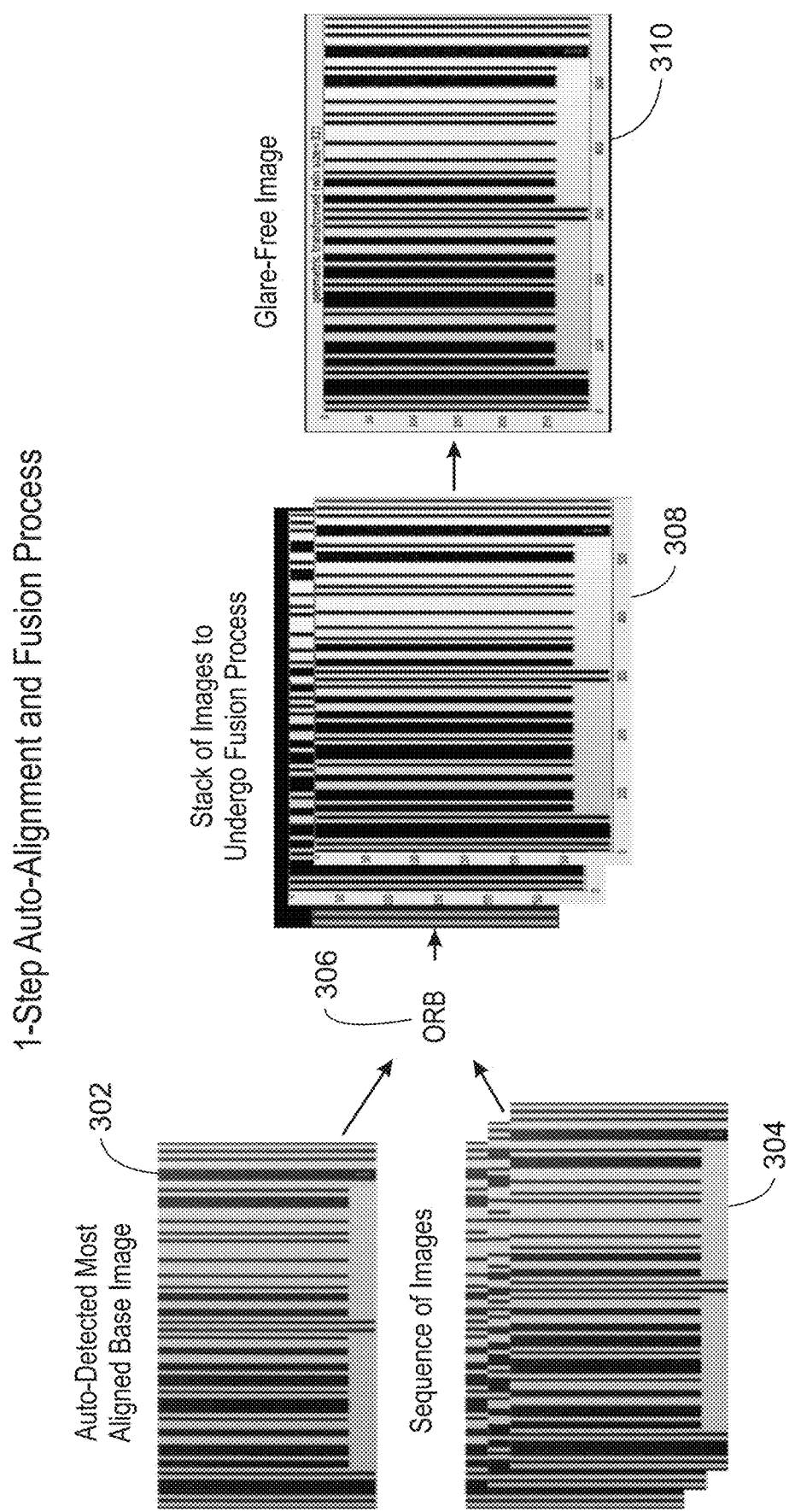
FIG. 3 is a block diagram of a one-step alignment-fusion process.
Figure 4:
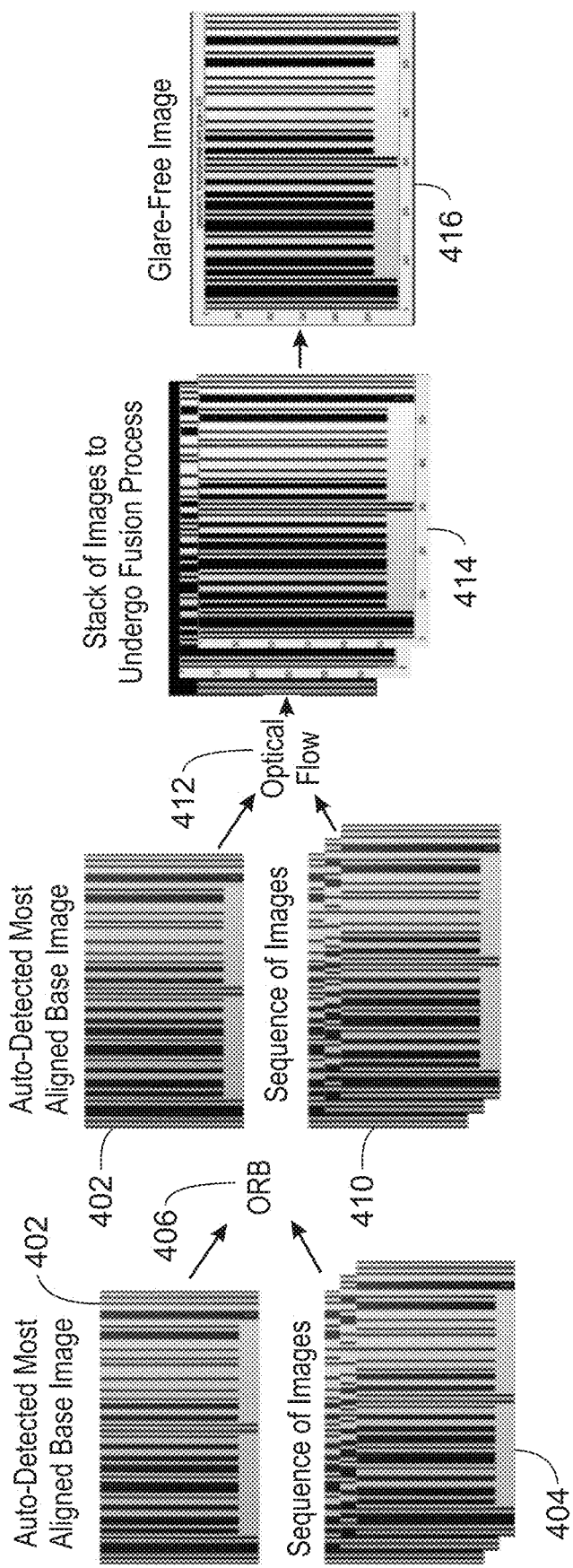
FIG. 4 is a block diagram of a two-step alignment-fusion process.
Figure 5:
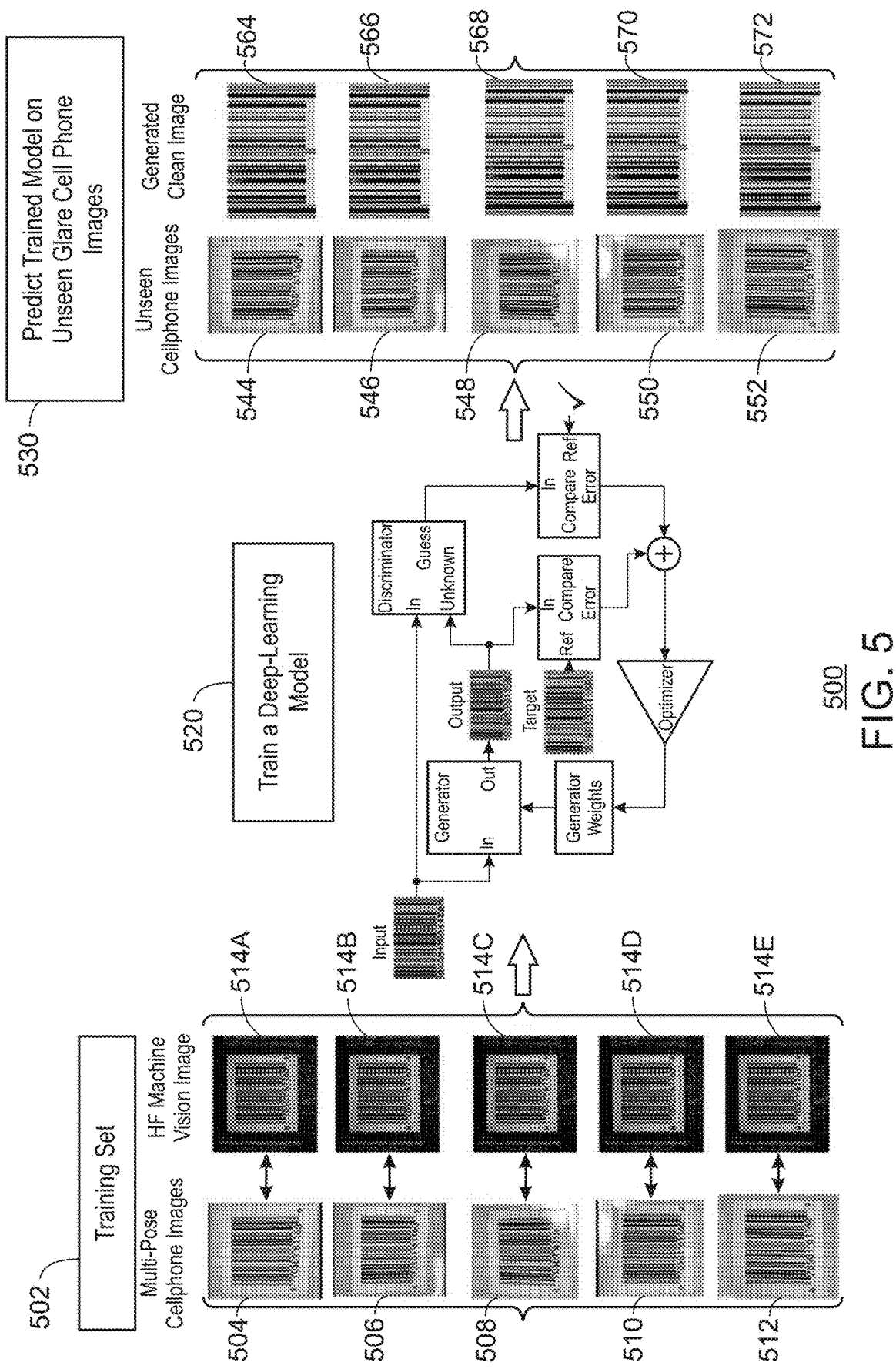
FIG. 5 is a block diagram of a system that shows training deep learning models to generate an image with reduced glare.

The present techniques can generate a single image from the images that contain a representation of the mark with reduced glare when compared to the images including multiple poses of the mark. In the example of FIGS. 2-4, an image with reduced glare is generated using a one-step alignment-fusion process or a two-step alignment-fusion process. In the example of FIGS. 5-7, an image with reduced glare is generated using neural networks trained on image pairs with multiple poses and corresponding high fidelity images.

FIG. 2 is a block diagram of workflows 200 for glare mitigation techniques in symbologies. The symbologies can include, for example, the symbology 100 described with respect to FIG. 1. As discussed above, the symbology includes a machine readable representation of a mark that is that is processed to extract information. The symbology can be, for example, a QR-code, barcode, or a mark generated by laser print. In examples, multiple poses of the mark are captured in multiple images. Generally, the multi-pose images are captured by an image capture device. As users capture multiple images of a mark from different orientations, there is a high probability of capturing a full or partial clean glare-free image in the multiple images. In examples, users are guided or prompted to use a device to capture multiple images of a mark. In some embodiments, the present techniques capitalize on the non-corrupt portions of each image to reconstruct/generate a clean-glare free image containing the mark.

In the example of FIG. 2, the multi-pose images are input to a one-step alignment process (e.g., process 210) or a two-step alignment process (e.g., process 220) in conjunction with a single or ensemble of image-fusion techniques. Alignment of the images generally refers to transforming images of the same mark such that the mark is at a substantially similar or same pose in the images. In examples, alignment of the images transforms the images to a same coordinate space.

In the one-step alignment-fusion process 210, the multi-pose images are aligned to a base image. Generally, in the one-step alignment-fusion process a suitable base image is selected from the multi-pose images, and the remainder of the multi-pose images are aligned to the base image. FIG. 3 is a block diagram of the one step alignment-fusion process 210.

Referring again to FIG. 2, at block 212 a base image is selected. In examples, the base image is selected using automated detection of a most aligned image from the multi-pose images. The base image is selected to ensure a suitable base image to transform the remainder of the images to a vector-space of the base image. In examples, the vector space refers to a collection of keypoints and description features defined by the base image. Each image of the remainder of the images undergoes a perspective transformation to the vector space. This type of transformation preserves collinearity and incidence, which enables the maintenance of straight lines in the images, even after the transformation. The selected base image has a lowest tilt angle when compared to tilt angles of the remaining images. In examples, contour detection is used to determine the tilt-angle of each image, and the image with the lowest tilt-angle is selected as the base image. Contour detection determines the borders of a mark in an image and localizes the mark within the image to determine the tilt angle. Contour-region detection may be enabled, for example, by a computer vision library such as OpenCV. In the example of FIG. 3, a most aligned base image 302 is selected and the remaining images 304 are shown. In some embodiments, most of the images are glare-corrupted, and processes are applied to multiple image-sets to determine an acceptable threshold-values for a tilt-angle. For example, the most aligned image ideally has a mean or median tilt angle that is approximately zero. In such cases, the threshold is selected based on the image that results in a mean or median tilt angle that is closest to zero. In some embodiments, the median tilt value of a set of multi-pose images is approximately zero, while the mean tilt values are non-zero. For such cases, the base image is selected according to the median tilt value of the multi-pose images being approximately zero.

Referring again to FIG. 2, at block 214 the remaining images are aligned to a vector space by determining correspondences between local features of the remaining image and the base image. In examples, the images are aligned by computing a homography matrix used to align the images. The homography matrix can use featured-based keypoint correspondences, similarity measures, or deep neural networks that automatically learn the transformation. The computed homography matrix is used to apply a perspective warp to align the remainder of the images to the base image. In some embodiments, a feature detector such as Oriented FAST and Rotated BRIEF (ORB) is used to transform the remainder of the images to a vector space of the selected base image. In the example of FIG. 3, the remaining images 304 are aligned to the base image 302 using ORB alignment 306.

Additionally, in the example of FIG. 3 the aligned images 308 output by the ORB alignment 306 are fused. Referring again to FIG. 2, at block 216, the aligned images are fused, e.g., using median, mean, singular value decomposition, and/or an ensemble approach. In some embodiments, the fusion process involves calculating a mean or median of corresponding pixel-values of the aligned images. The resulting glare free image includes pixel values that are the mean or median of corresponding pixel values from the aligned images. In examples, the fusion process is based on singular value decomposition (SVD). SVD generalizes the eigen decomposition of a square normal matrix with an orthonormal eigen basis to any m×n matrix. SVD includes three principal components. In examples, SVD is applied to a fused image, and the first principal component of the fused image is observed to be a glare-free representation of the aligned images (e.g., common mode data), while the glare (e.g., variations among the aligned images) occupies the other higher order components. Accordingly, in some embodiments an image with reduced or eliminated glare is the first principal component of aligned images processed using SVD.

In examples, the fusion includes an ensemble approach of combining a fused image output by each of the mean, median, and SVD fusion approaches. The result of the fusion at block 216 is an image of the mark with reduced glare (or that is glare free) when compared to the multi-pose images of the mark. In the example of FIG. 3, a glare-free image 310 is output by fusion applied to the aligned images. In some embodiments, the glare-free image 310 is tested through a series of image-similarity methods and a correlation based image-similarity process to compare it with one or more, e.g. a series of, high fidelity (HF) machine vision images. In examples, an acceptable glare-free image 310 ensures a sufficiently high correlation score and appropriate pairing with its high fidelity machine vision counter-part. In embodiments, testing ensures that the resultant glare free-phone images are able to achieve sufficiently high similarity scores against their high fidelity counter-part. Testing is also used to automate the process of ensuring a quality check/avoid counterfeits in a supply-chain line where appropriate similarity scores will ensure that the resultant glare-free cell phone images are paired to their appropriate high fidelity counter-part.

Referring again to FIG. 2, in the two-step Alignment-Fusion Process 220 the images are twice aligned. FIG. 4 is a block diagram of the two step alignment-fusion process 220. Similar to the one-step auto-alignment process 210, as users capture multiple images of the mark from different orientations, there is a high probability of capturing a full or partial clean glare-free image in the multiple images. In some embodiments, the present techniques capitalize on the non-corrupt portions of each image to generate a clean-glare free image.

Referring again to FIG. 2, at block 222, a base image is selected. In examples, the base image is selected using automated detection of the most aligned image from the multi-pose images. The base image has a lowest tilt angle, and can be selected using contour detection. In examples, OpenCV based contour detection methods are used to determine the tilt-angle of each the multi-pose images, and the image with a lowest tilt-angle is selected as the base image. In the example of FIG. 4, a most aligned base image 402 is selected and the remaining images 404 are shown. In the example of FIG. 2, at block 224 the remainder of images are first aligned with respect to the base image. In some embodiments, the first alignment is realized by computing a homography matrix or using ORB alignment. In the example of FIG. 4, the remaining images 404 are aligned to the selected base image 402 using ORB alignment 406.

Referring again to FIG. 2, at block 226 a second alignment is applied to the first aligned images. The second alignment includes an optical flow applied to the first aligned images. In examples, the second alignment enables fine adjustments that are applied to the ORB aligned images, where the images are further aligned to the base image using the optical flow. Applying an optical flow to the aligned images can include calculating a motion of image intensities and resulting flow fields for each image. The image intensities and flow fields are analyzed to further align the ORB-aligned images. In the example of FIG. 4, the ORB aligned images 410 are transformed to align with the base image 402 using the optical flow alignment 412. The optical flow executed by the optical flow alignment 412 is optimized iteratively across the following parameters levels, such as: number of pyramid layers; averaging window size; number of iterations at each pyramid level; size of pixel neighborhood used to determine appropriate polynomial expansion in each pixel; and standard deviation of the Gaussian that is used to smooth derivatives used as a basis for the polynomial expansion. In an exemplary use case associated with barcodes, the optimal pyramid layers=15, average-window-size=32, number of iterations at each pyramid level=20, poly-expansion in each pixel=34 and Gaussian standard-deviation=0.7. The output of the optical flow alignment 412 are twice aligned images 414.

Referring again to FIG. 2, at block 228, the twice aligned images are fused, e.g., using, median, mean, SVD, and/or an ensemble approach. The fusion at block 228 is similar to the fusion at block 216. In the example of FIG. 4, the twice aligned images 414 of FIG. 4 undergo fusion as described herein. Generally, fusion ensures the presence of stable specular components that reduce or eliminate glare in an output image. The result of the fusion at block 228 is an image of the mark with reduced glare or that is glare free when compared to the multi-pose images of the mark. In the example of FIG. 4, a glare-free image 416 is output by fusion applied to the aligned images 414.

In some embodiments, an image with reduced glare or a glare free image is produced using neural networks. The present techniques train deep learning models on multi-pose images with corresponding high fidelity machine-vision images to learn the underlying signatures of a clean image. Accordingly, trained deep learning models obtain as input one or more images and output a glare free image or an image with reduced glare when compared to the input images. The deep-learning algorithms can use neural networks such as generative adversarial networks (GANs), neural style-transfers, variational auto-encoders (VAEs), and the like. The neural networks can be trained using image pairs that include a multi-pose image and a high fidelity image. The trained model obtains as input an unseen image (e.g., an image in the wild) with glare and outputs an image with reduced glare or a glare-free image.

FIG. 5 is a block diagram of a system 500 that shows training deep learning models to output an image with reduced glare. The training set 502 includes data used for training one or more machine learning models. In the example of FIG. 5, the training set 502 includes a set of training images 504, 506, 508, 510, and 512. In embodiments, the set of images 504, 506, 508, 510, and 512 are images captured in the wild, e.g., multi-pose cellphone images. The training set further includes high fidelity machine vision images 514A, 514B, 514C, 514D, and 514E (collectively referred to as high fidelity images 514).

Generally, the training set 502 is used to train one or more deep learning models 520. Accordingly, the deep learning model(s) 520 are trained using high fidelity machine vision images and sets of training images, each element of the set including multiple poses of another mark that correspond to at least one of the high fidelity machine vision images. The deep learning model(s) 520 can be, for example, neural networks such as GANs, neural style-transfers, VAEs, and the like. The deep learning model(s) 520 can be trained using pairs of multiple pose input images (e.g., images 504, 506, 508, 510, and 512) and high fidelity machine vision images 514. In examples, deep learning model(s) 520 include networks trained on pixel-wise pairings between the training input images 504, 506, 508, 510, and 512 and the corresponding high fidelity machine vision images 514. In particular, the neural networks can be trained using pixel wise comparison. The trained deep learning models generate predictions 530. In particular, after training, previously unseen images 544, 546, 548, 550, and 552 are input to the trained deep learning model(s) 520. The trained deep learning model(s) 520 then output respective images 564, 566, 568, 570, or 572 with a reduced glare or that are glare free. For example, clean images 564, 566, 568, 570, or 572 can be generated from recently received cellphone images using the deep learning model(s) 520. In some embodiments, training the deep learning model(s) 520 includes update the weights of the deep learning model(s) 520, wherein updating the weights includes retraining the models on newer unseen images from the wild.

Figure 6A:
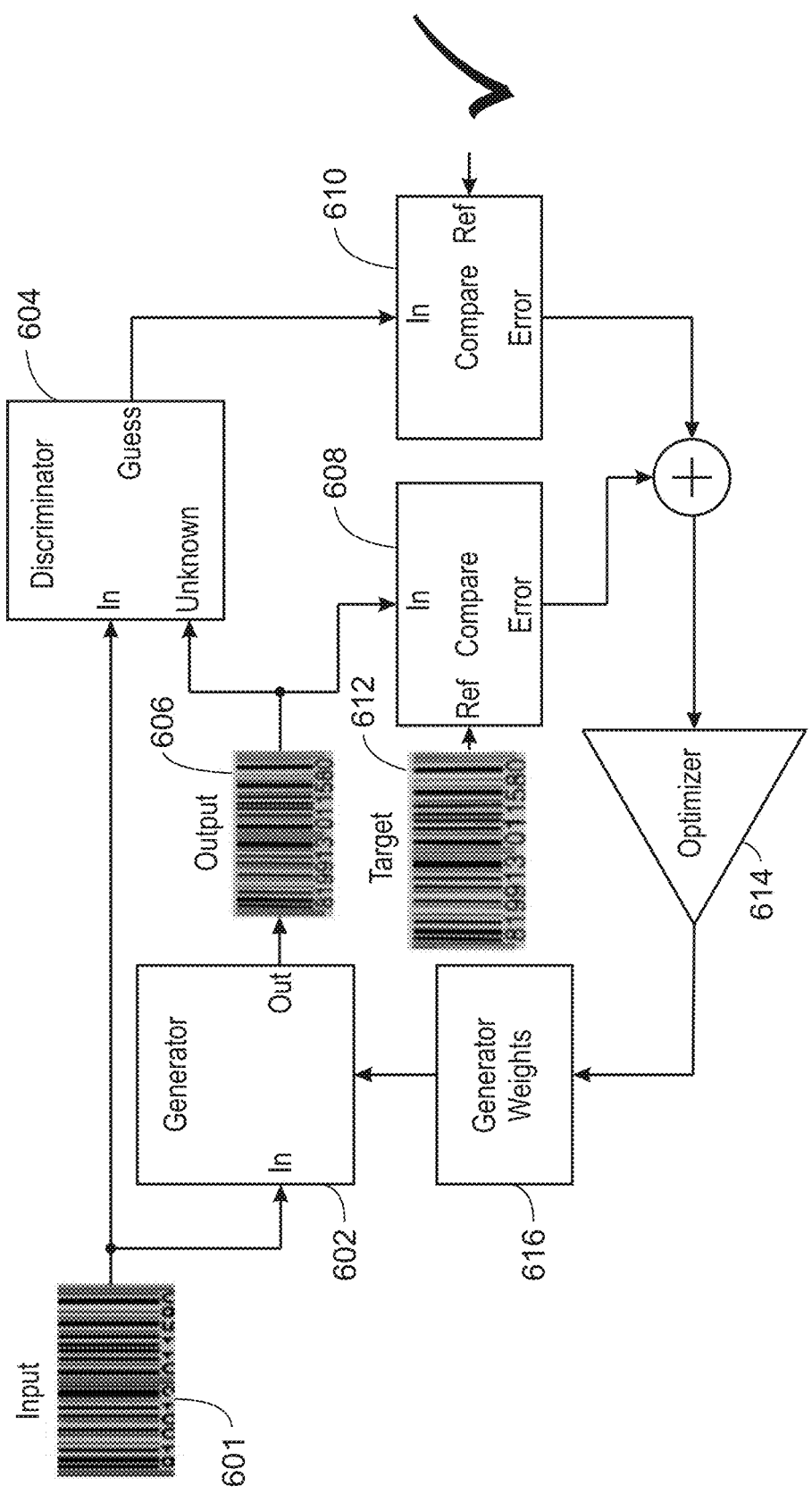
FIG. 6A shows a generative adversarial network.
Figure 6B:
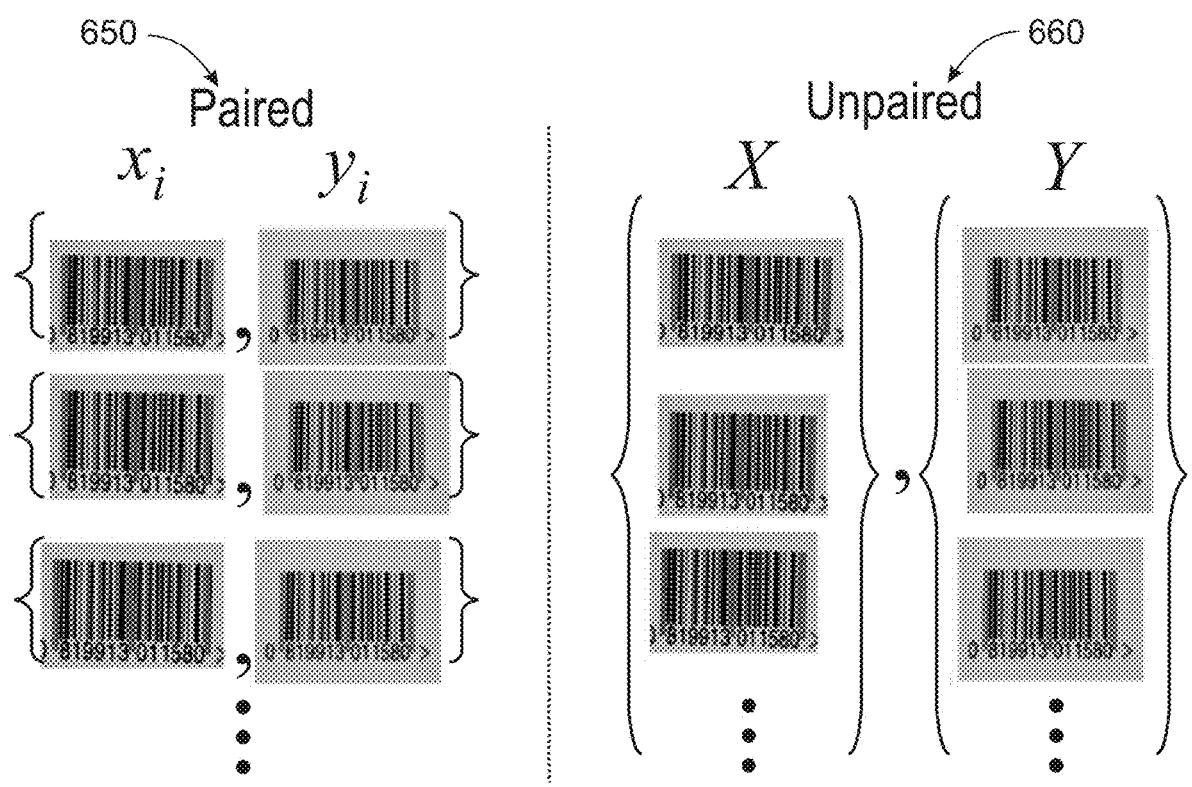
FIG. 6B shows paired images and unpaired images.
Figure 7:
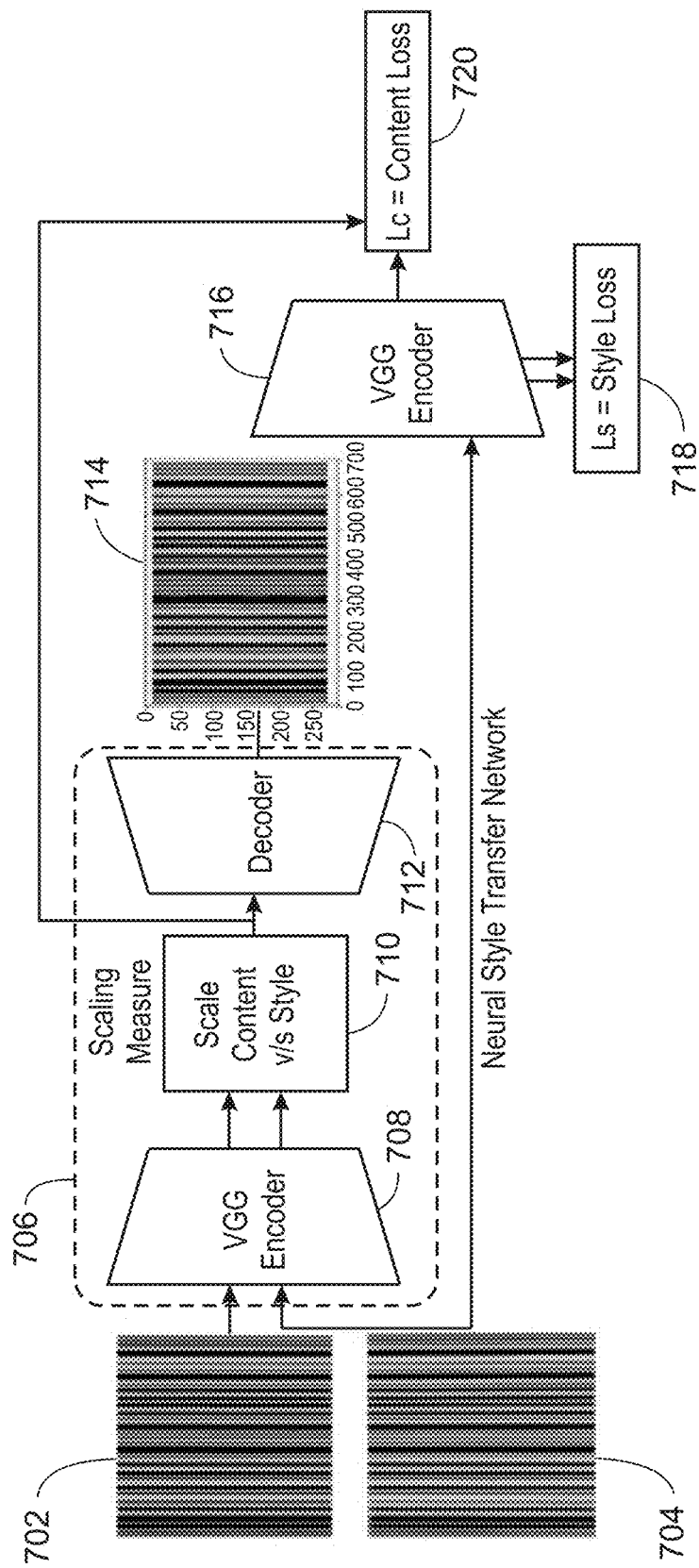
FIG. 7 is a block diagram of a neural style transfer model.

FIG. 6A shows a general adversarial network 600A. In examples, the GAN 600A is a deep learning model 520 (FIG. 5). Generally, a trained GAN takes as input an unseen image with glare an outputs a glare free image. FIG. 6B shows paired images 650 and unpaired images 660. In some embodiments, the GAN 600A is a cycle GAN. A cycle GAN is trained using unpaired images 660 and learns a generalized transfer function to remove glare from the images based on the source high fidelity images. Images with glare are input to the cycle GAN and the cycle GAN outputs glare free images. When training a cycle-GAN, exact pairings of glare corrupt cell phone images and their high fidelity counter-part images are not needed as the GAN attempts to learn an underlying clean image signatures of a high-fidelity image from these glare corrupt multi-pose cell phone images. In some embodiments, the GAN 600A is a pixel-to-pixel GAN, and is trained using paired images 650. A pixel-to-pixel GAN preserves information in the image used to generate an electronic signature for authentication as described with respect to FIG. 9.

In some embodiments, the GAN 600A is trained using paired images 650. Each image pair includes a captured image and a machine vision image. In examples, the captured image is an image captured in the wild, and the machine vision image is a high fidelity machine vision image. In some embodiments, the GAN 600A is trained using unpaired images 660. The unpaired images include images captured in the wild as well as high fidelity machine vision images.

In the example of FIG. 6A, the GAN 600A includes two neural networks that are communicatively coupled such that new images are generated with the same statistics present in the training images. A discriminator 604 is a neural network that is indirectly trained using the images that are output 606 by a generator 602. The generator 602 is a neural network that generates images that are input to the discriminator 604.

In some embodiments, the discriminator 604 is trained using images with glare and a corresponding high fidelity machine vision image. The discriminator 604 is trained to determine whether an input image 601 is glare-free as close to the target image or a synthetized image, with glare, from the generator 602. In some embodiments, the generator 602 and the discriminator 604 are trained using back propagation in an unsupervised manner.

The output 606 of the generator 602 is input to a comparator 608, and the output of the discriminator 604 is input to a comparator 610. A target 612 is also input to the comparator 608. The output of the comparators 608, 610 is summed and input to an optimizer 614. In some embodiments, the optimizer 614 learns features of the images and minimizes an error or loss associated with the generated images. The optimizer outputs generator weights 616. In some examples, the generator weights are applied to the generator 602 to update current generator weights. In the example of FIG. 6B, training images 600B are shown.

FIG. 7 is a block diagram that shows a neural style transfer network 700. In examples, the neural style transfer network is a deep learning model 520 (FIG. 5). In the example of FIG. 7, an image 702 and an image 704 are provided as input. In some embodiments, image 702 is a glare corrupt cell phone input image and image 704 is a style input image which is high-fidelity image. Generally, neural style transfer is an optimization technique that trains a model using content images and style reference images. These images are used to transform unseen glare corrupt cell phone images with glare, to resemble the style images that are glare free.

The style transfer 706 includes an encoder 708, a scaling measure 710 (to scale content versus style), and a decoder 712. Generally, the style transfer 706 is a convolutional encoder/decoder network that enables pixel-wise predictions of an output image. In some embodiments, the encoder extracts high-level abstract features from the images. In the example of FIG. 7, the encoder 708 is a visual geometry group (VGG) encoder. The VGG encoder is a pre-trained encoder which extracts essential features from a glare-corrupt image using optimized sets of VGG layers in feed-forward step. The extracted features are input to a scaling measure 710. The scaling measure 710 increases a scale of images and transfers a style to the high level features. A decoder 712 decodes the scaled features into an output image 714. The output image 714 is input to a second encoder 716. In examples, the second encoder is a VGG encoder which extract features from high-fidelity style images using optimized VGG layers. The optimized VGG layers for content and style encoders are determined iteratively based on the generated images. The second encoder 716 further optimizes style loss 718 and content loss 720 to ensure the generated image has essential features from content as well as style images that will result in a suitable glare free image The generated glare free image is further compared to high fidelity images using several image similarity metrics to ensure a successful glare mitigation process.

In some embodiments, the deep learning model(s) 520 (e.g., GAN 600A, neural style transfer network 700, variational auto encoders, etc.) are used to generate an ensemble of predictions. Additionally a performance of the deep learning model(s) 520 is evaluated. In a first evaluation pass, the generated images output by the models are compared with an arbitrary clean high fidelity image using standard image similarity metrics such as Frechet Inception Distance (FID), MSE (Mean Squared Error), and Structural Similarity Indices (SSIM). The FID score calculates the distance between feature vectors calculated for real and generated images. Lower scores indicate the two groups of images are more similar, or have more similar statistics, with a perfect score being 0.0 indicating that the two groups of images are identical.

In a second evaluation pass, the images generated according to the present techniques are evaluated using an image similarity method (based on correlation scores). Each generated clean-image is compared to a series of high-fidelity machine vision images. An acceptable generated image ensures a sufficiently high correlation score and appropriate pairing with its high fidelity machine vision counter-part.

Figure 8:
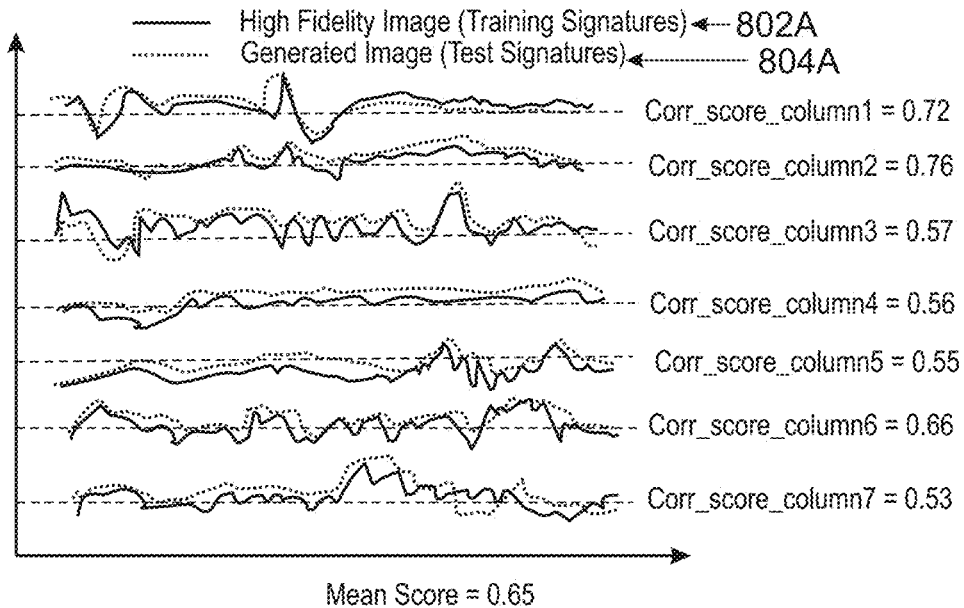
FIG. 8 shows training signatures.
Figure 8:
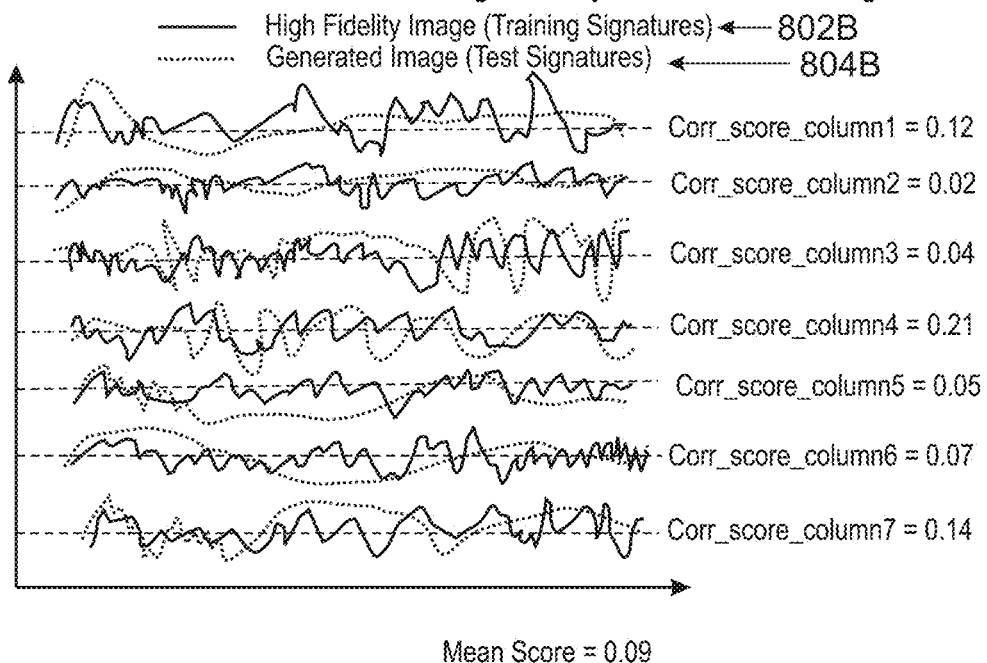

FIG. 8 is an illustration of training signatures. The plots of FIG. 8 include a high correlation between high fidelity and generated images at chart 810 and a poor correlation between high fidelity and generated images at chart 820. For each of the charts 810 and 820, high fidelity image training signatures and generated image test signatures are shown. In the chart 810, high fidelity image training signatures 802A and generated image test signatures 804A are shown. In the chart 820, high fidelity image training signatures 802B and generated image test signatures 804B are shown. In FIG. 8, the high fidelity image training signatures 802A and high fidelity image training signatures 802B (collectively referred to as high fidelity image training signatures 802) are shown with a solid line. Similarly, generated image test signatures 804A and generated image test signatures 804B (collectively referred to as generated image test signatures 804) are shown with a dashed line. A high overlap between the high fidelity image training signatures 802 and generated image test signatures 804 results in a better correlation scores and vice-versa. Thus, acceptable generated glare-free images are considered to have sufficiently high correlation scores along with consistent high fidelity machine vision pairings. For each model, successful image restoration or regeneration process resulted in an average of correlation scores~(0.5-0.8) range. In the chart 810, the mean correlation score is 0.66 indicating a high correlation between high fidelity and generated images. On the contrary, the correlation scores in a glare-corrupt image were ~(0.0-0.14). In the chart 820, the mean correlation score is 0.09 indicating a poor correlation between high fidelity and generated images.

Figure 9:
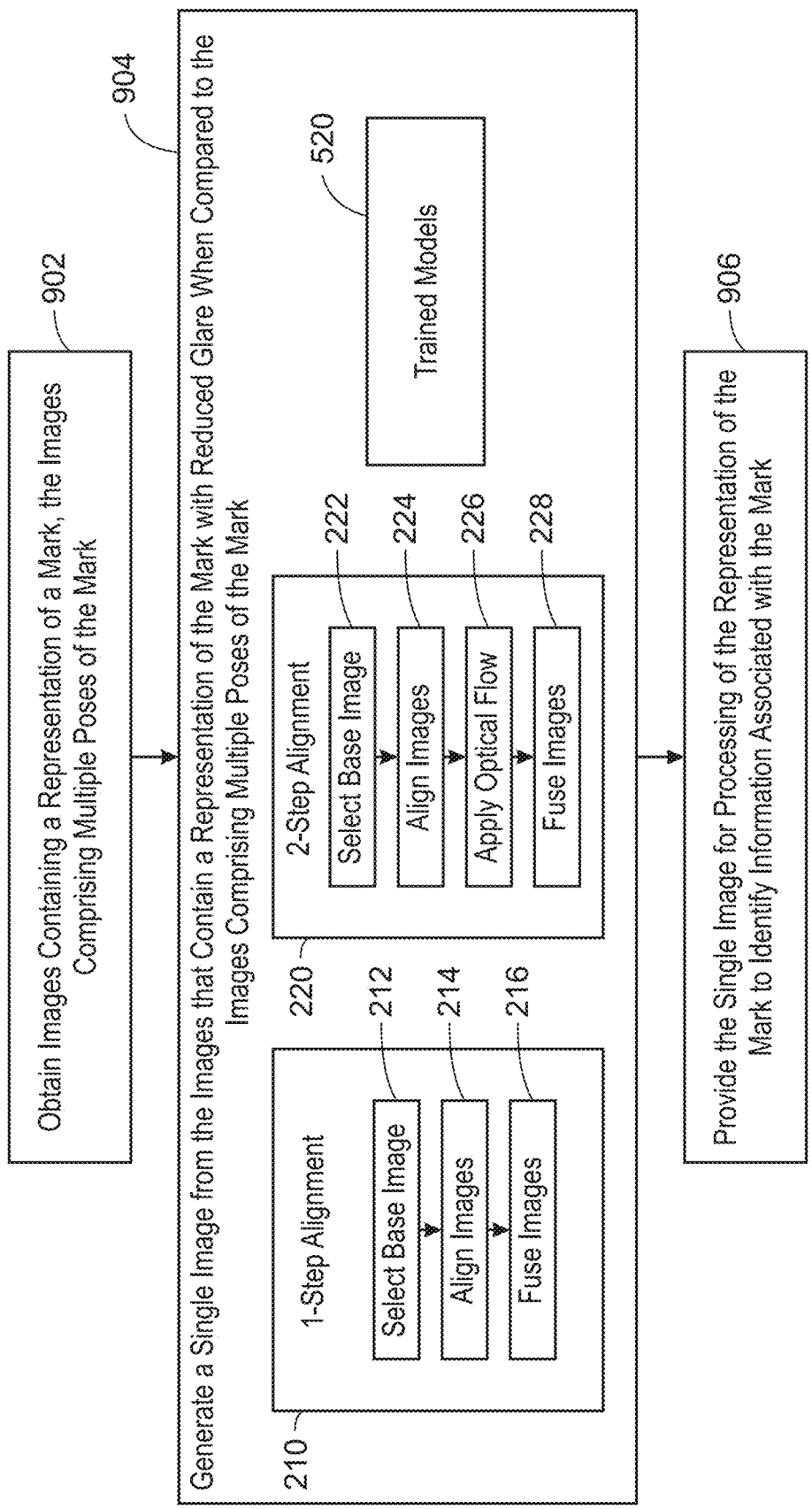
FIG. 9 shows a process for glare mitigation techniques in symbologies.

FIG. 9 shows a process 900 for glare mitigation techniques in symbologies. The process 900 can include the workflows 200 of FIG. 2, the deep learning model(s) 520 of FIG. 5, or any combinations thereof. The process 900 can be executed by the system 1000 of FIG. 10. At block 902, images are obtained that include a representation of a same mark. In some embodiments, the mark is a machine-readable portion of a symbology. The images contain multiple poses of the mark. In some embodiments, the mark is a one-dimensional or two-dimensional code such as a QR-code, barcode, and the like. The mark is created through various printing processes, such as laser print, inkjet, thermal printing, and the like. Each image of the images captures at least a portion of the mark. In some embodiments, the images are captured directly by a process that generates a single reduced glare image from the obtained images. In some embodiments, the images are obtained from another source, such as a third party, remote process, or remote device.

At block 904, a single image is generated from the obtained images. The generated single image contains a representation of the mark with a reduced glare when compared to the obtained images that include multiple poses of the mark. The generating can be performed using a one-step alignment process 210 (FIG. 2), a two-step alignment process 220 (FIG. 2), trained deep learning model(s) 520 (FIG. 5), or any suitable combinations thereof. At block 906, the single image is provided for processing of the representation of the mark to identify information associated with the mark. In examples, the mark is decoded to determine a message contained in the mark.

In some embodiments, the single image is obtained by counterfeit detection algorithms to determine an authenticity of a mark. The authenticity of a mark refers to a classification of genuine or photocopy/counterfeit associated with the mark. In examples, a set of metrics associated with characteristics of the mark is measured. To calculate the set of metrics, the mark is divided into a grid of cells, each cell representing a portion of the mark. In examples, the metrics include, for example, a deviation in average cell pigmentation or marking intensity, a cell position bias relative to a best-fit grid, the presence or location of extraneous marks or voids in the mark, and the shape (linearity) of long continuous edges of the mark. An electronic signature is generated based on the set of metrics for the genuine mark. The electronic signature is generated using the single image that has reduced or eliminated glare, improving the accuracy of the electronic signature generated using the single image.

The following documents are incorporated by reference, in their entirety: U.S. Provisional Application Ser. No. 63/292,706, filed Dec. 22, 2021; U.S. Pat. No. 10,387,703, filed Sep. 5, 2018, and issued Aug. 20, 2019; and U.S. Pat. No. 10,235,597 filed Jun. 13, 2016, and issued Mar. 19, 2019. In some embodiments, an authenticity of the mark is determined as described in the documents incorporated by reference. In examples, a representation of the mark with a reduced glare as provided in the generated single image is used for authentication.

Figure 10:
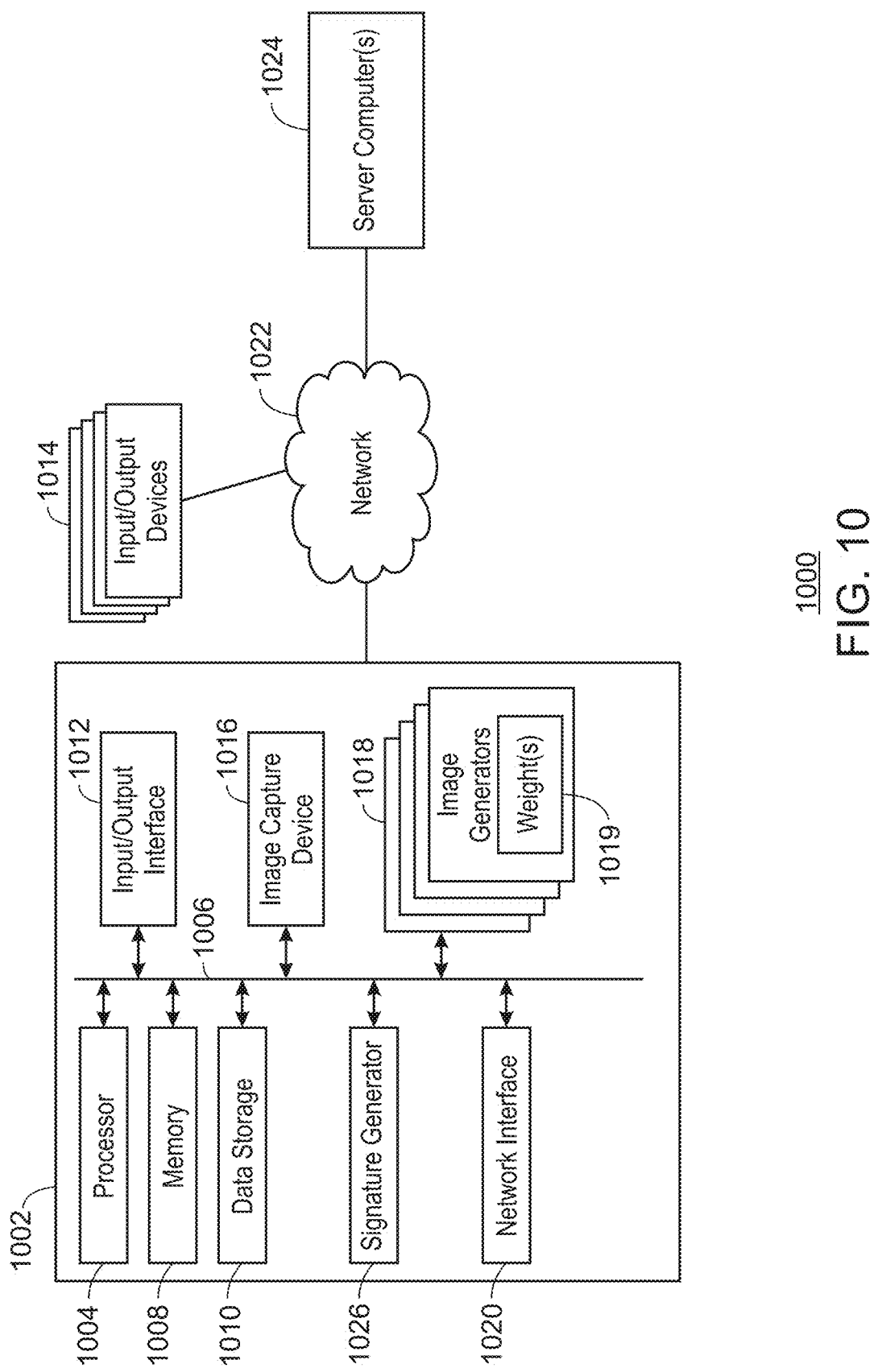
FIG. 10 is a block diagram of a system that enables glare mitigation techniques in symbologies.

FIG. 10 is a block diagram of a system 1000 that enables glare mitigation techniques in symbologies. The system 100 can execute the process 900 of FIG. 9 using the workflows 200 of FIG. 2, the deep learning model(s) 520 of FIG. 5, or any suitable combinations thereof. In examples, the system 1000 includes, among other equipment, a controller 1002. Generally, the controller 1002 is small in size and operates with lower processing power, memory and storage when compared to other processors such as GPUs or CPUs. In some embodiments, the controller 1002 consumes very little energy and is efficient. In examples, the controller 1002 is a component of (or is) a mobile device, such as a cellular phone, tablet computer, and the like. In some cases, the controller 1002 is operable using battery power and is not required to be connected to mains power.

The controller 1002 includes a processor 1004. The processor 1004 can be a microprocessor, a multi-core processor, a multithreaded processor, an ultra-low-voltage processor, an embedded processor, or a virtual processor. In some embodiments, the processor 1004 can be part of a system-on-a-chip (SoC) in which the processor 1004 and the other components of the controller 1002 are formed into a single integrated electronics package.

The processor 1004 can communicate with other components of the controller 1002 over a bus 1006. The bus 1006 can include any number of technologies, such as industry standard architecture (ISA), extended ISA (EISA), peripheral component interconnect (PCI), peripheral component interconnect extended (PCIx), PCI express (PCIe), or any number of other technologies. The bus 1006 can be a proprietary bus, for example, used in an SoC based system. Other bus technologies can be used, in addition to, or instead of, the technologies above.

The bus 1006 can couple the processor 1004 to a memory 1008. In some embodiments, such as in PLCs and other process control units, the memory 1008 is integrated with a data storage 1010 used for long-term storage of programs and data. The memory 1008 can include any number of volatile and nonvolatile memory devices, such as volatile random-access memory (RAM), static random-access memory (SRAM), flash memory, and the like. In smaller devices, such as programmable logic controllers, the memory 1008 can include registers associated with the processor itself. The storage 1010 is used for the persistent storage of information, such as data, applications, operating system(s), and so forth. The storage 1010 can be a nonvolatile RAM, a solid-state disk drive, or a flash drive, among others. In some embodiments, the storage 1010 will include a hard disk drive, such as a micro hard disk drive, a regular hard disk drive, or an array of hard disk drives, for example, associated with a distributed computing system or a cloud server.

The bus 1006 couples the processor 1008 to an input/output interface 1012. The input/output interface 1012 connects the controller 1002 to the input/output devices 1014. In some embodiments, the input/output devices 1014 include printers, displays, touch screen displays, keyboards, mice, pointing devices, and the like. In some examples, one or more of the I/O devices 1014 can be integrated with the controller 1002 into a computer, such as a mobile computing device, e.g., a smartphone or tablet computer. The controller 1002 also includes an image capture device 1016. Generally, the image capture device 1016 includes hardware associated with image capture. The image capture device can be, for example, a camera or scanner. In some embodiments, the image capture device 1016 automatically captures a representation of a mark. In some embodiments, the image capture device 1016 captures a representation of a mark in response to input from a user at an input/output device 1014.

The controller 1002 also includes one or more image generators 1018. The image generator(s) 1018 can be, for example, workflows 200 of FIG. 2 (e.g., the process 210 of FIG. 2 and the process 220 of FIG. 2), the trained deep learning model(s) 520 of FIG. 5, or any suitable combinations thereof. In some embodiments, the image generators include one or more weights 1019. The weight(s) 1019 can be updated or modified to fine tune the output of the image generator(s) 1018. In some embodiments, the image generator(s) 1018 output a single image with a reduced glare when compared to multiple-pose images provided as input. Additionally, the controller 1002 includes a network interface 1020. The network interface 1020 enables the controller 1002 to transmit and receive information across a network 1022. Although not shown in the interests of simplicity, several similar controllers 1002 can be connected to the network 1022. In some embodiments, multiple controllers 1002 include image generator(s) 1018 communicatively coupled with one or more server computers 1024. In some embodiments, a server computer 1024 obtains images with reduced glare from one or more controllers 1002 and aggregates obtained information to continually update (e.g., modify weights associated with) the image generators distributed across the one or more controllers 1002. In this manner, the present techniques enable continuous learning by the image generators using newly obtained data.

In some embodiments, a signature generator 1026 measures a set of metrics associated with a characteristic of a mark in the image output by the image generator(s) 1018 and generates an electronic signature based on the set of metrics for the mark. The fingerprinting process performed by the signature generator 1026 and the image generation performed using one or more image generators 1018 need not be implemented in the same one or more computers 1002, 1024. In some implementations, they are implemented on one or more separate computers 1002, 1024, and communicate with each other over the network 1022.

Other implementations are also within the scope of the following claims.

What is claimed is:

1. A method, comprising:
obtaining, with at least one processor, first images containing a representation of a mark, the images comprising multiple poses of the mark;
generating, with the at least one processor, a single image with reduced glare from the first images using a trained machine learning model, wherein the glare associated with the single image is reduced relative to glare associated with the first images; and
providing, with the at least one processor, the single image for processing of the representation of the mark to identify information associated with the mark.

2. The method of claim 1, wherein the trained machine learning model is a cycle generative adversarial network.

3. The method of claim 1, wherein the machine learning model is a neural network trained using a neural style transfer, wherein a style is learned from high fidelity machine vision images and content is learned from training images comprising multiple poses of another mark.

4. The method of claim 1, wherein the machine learning model is a variational auto-encoder.

5. The method of claim 1, wherein the first images comprise multiple poses of the mark with varying levels of illumination, varying levels of glare, and varying locations of the glare.

6. The method of claim 1, wherein the trained machine learning model is trained on image pairs with multiple poses and corresponding high fidelity images.

7. The method of claim 2, wherein the cycle generative adversarial network is trained using unpaired images, wherein the cycle generative adversarial network learns a generalized transfer function to remove glare from the unpaired images based on source high fidelity images.

8. A system, comprising:
at least one processor, and
at least one non-transitory storage media storing instructions that, when executed by the at least one processor, cause the at least one processor to:
obtain first images containing a representation of a mark, the images comprising multiple poses of the mark;
generate a single image with reduced glare from the first images using a trained machine learning model, wherein the glare associated with the single image is reduced relative to glare associated with the first images; and
provide the single image for processing of the representation of the mark to identify information associated with the mark.

9. The system of claim 8, wherein the trained machine learning model is a cycle generative adversarial network.

10. The system of claim 8, wherein the machine learning model is a neural network trained using a neural style transfer, wherein a style is learned from high fidelity machine vision images and content is learned from training images comprising multiple poses of another mark.

11. The system of claim 8, wherein the machine learning model is a variational auto-encoder.

12. The system of claim 8, wherein the first images comprise multiple poses of the mark with varying levels of illumination, varying levels of glare, and varying locations of the glare.

13. The system of claim 8, wherein the trained machine learning model is trained on image pairs with multiple poses and corresponding high fidelity images.

14. The system of claim 9, wherein the cycle generative adversarial network is trained using unpaired images, wherein the cycle generative adversarial network learns a generalized transfer function to remove glare from the unpaired images based on source high fidelity images.

15. At least one non-transitory storage media storing instructions that, when executed by at least one processor, cause the at least one processor to:
obtain first images containing a representation of a mark, the images comprising multiple poses of the mark;
generate a single image with reduced glare from the first images using a trained machine learning model, wherein the glare associated with the single image is reduced relative to glare associated with the first images; and
provide the single image for processing of the representation of the mark to identify information associated with the mark.

16. The least one non-transitory storage media of claim 15, wherein the trained machine learning model is a cycle generative adversarial network.

17. The least one non-transitory storage media of claim 15, wherein the machine learning model is a neural network trained using a neural style transfer, wherein a style is learned from high fidelity machine vision images and content is learned from training images comprising multiple poses of another mark.

18. The least one non-transitory storage media of claim 15, wherein the machine learning model is a variational auto-encoder.

19. The least one non-transitory storage media of claim 15, wherein the first images comprise multiple poses of the mark with varying levels of illumination, varying levels of glare, and varying locations of the glare.

20. The least one non-transitory storage media of claim 15, wherein the trained machine learning model is trained on image pairs with multiple poses and corresponding high fidelity images.

21. The least one non-transitory storage media of claim 16, wherein the cycle generative adversarial network is trained using unpaired images, wherein the cycle generative adversarial network learns a generalized transfer function to remove glare from the unpaired images based on source high fidelity images.

* * * * *